Sept. 12, 1967     P. S. DOUGHERTY ET AL     3,341,086
TANK ASSEMBLY FOR DOMESTIC WATER SUPPLY SYSTEM
Filed Oct. 21, 1965     3 Sheets-Sheet 1
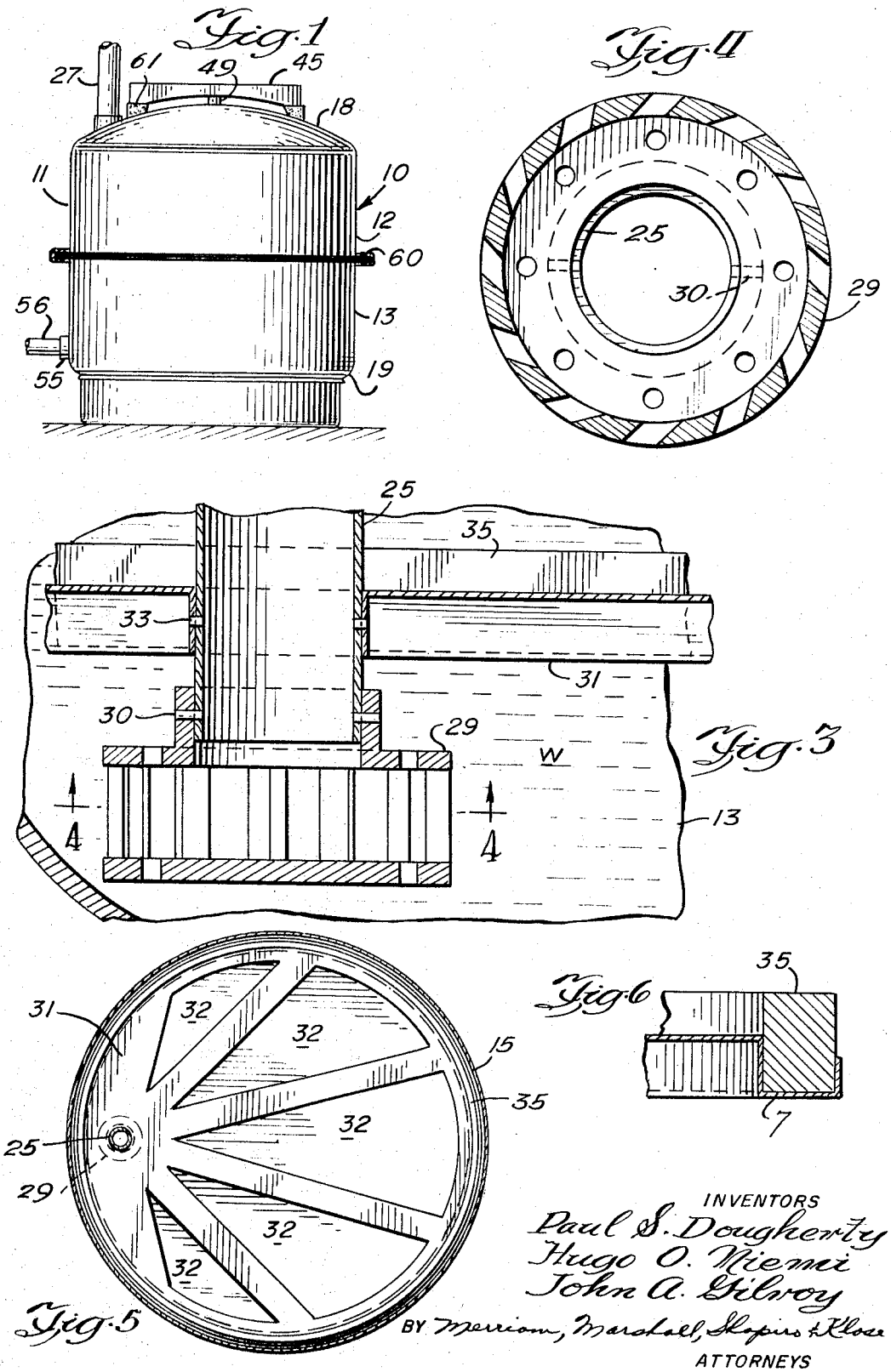
INVENTORS
Paul S. Dougherty
Hugo O. Niemi
John A. Gilroy
BY Merriam, Marshall, Shapiro & Klose
ATTORNEYS

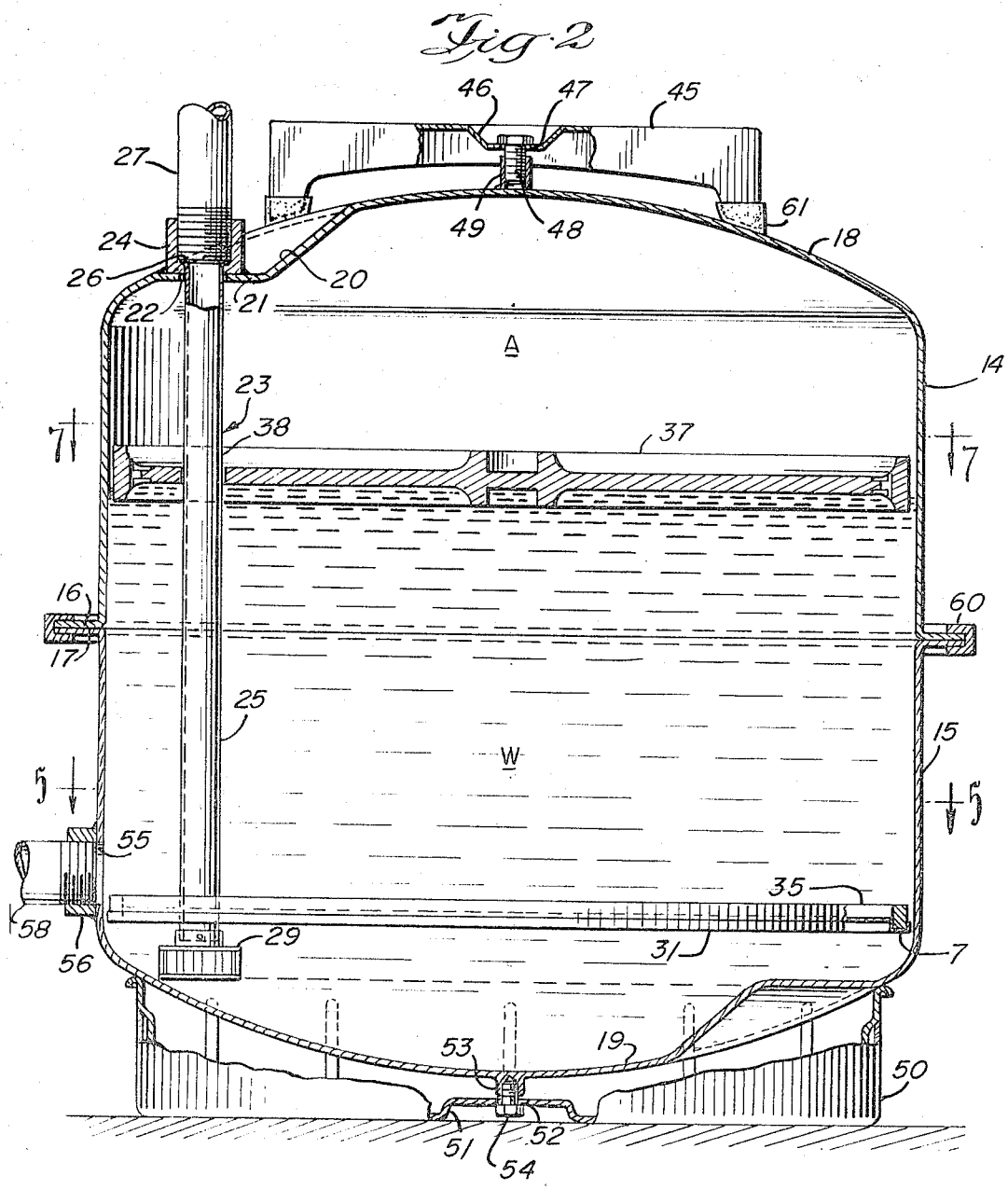

Sept. 12, 1967   P. S. DOUGHERTY ET AL   3,341,086
TANK ASSEMBLY FOR DOMESTIC WATER SUPPLY SYSTEM
Filed Oct. 21, 1965   3 Sheets-Sheet 3
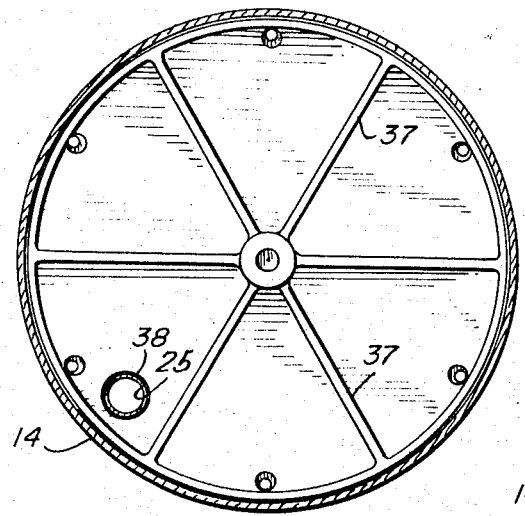
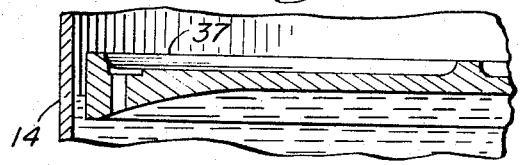
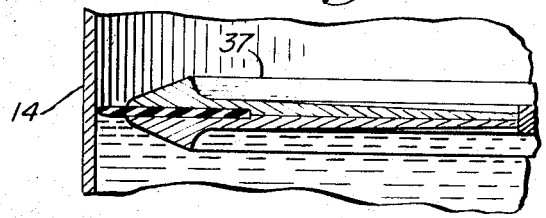
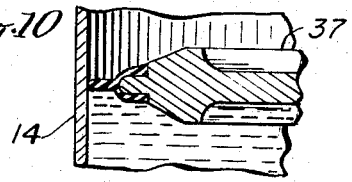
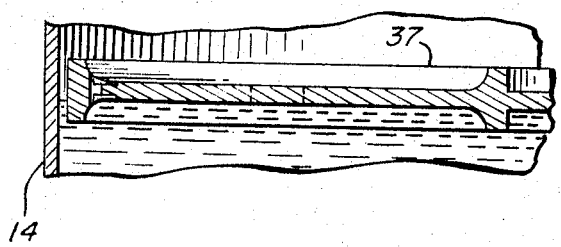
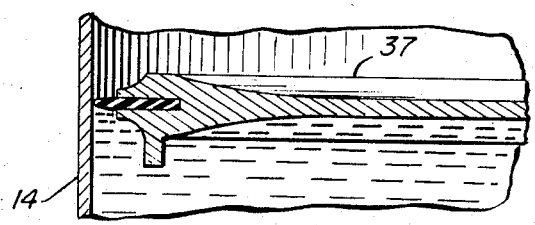
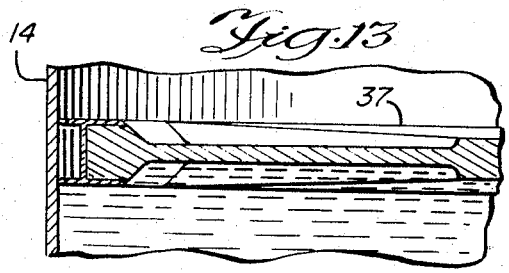
INVENTORS
Paul S. Dougherty
Hugo O. Niemi
John A. Gilroy
BY Merriam, Marshall, Shapiro & Klose
ATTORNEYS United States Patent Office 3,341,086
Patented Sept. 12, 1967

3,341,086
TANK ASSEMBLY FOR DOMESTIC WATER
SUPPLY SYSTEM
Paul S. Dougherty, Chicago, and John A. Gilroy and
Hugo O. Niemi, Olympia Fields, Ill., assignors to Metal
Coating Corporation, Chicago, Ill., a corporation of
Delaware
Filed Oct. 21, 1965, Ser. No. 499,201
13 Claims. (Cl. 222—383)

This invention relates generally to an improvement in automatic water systems and more particularly relates to a new and improved vertical tank assembly for storing water or the like.

Automatic water systems are employed to make availabel automatically an adequate supply of water at one or more outlets, e.g., faucet or appliance, in a home or building. Generally, the types employed range from large installations where a pump delivers water to an elevated storage tank where the water flows by gravity to particular water outlets or faucets to domestic systems which generally employ a pressure system in which water is pumped into a closed tank and as the water fills the tank, the air within the tank is compressed. Upon opening of a faucet or valve, the compressed air within the tank expands thereby forcing water, under pressure, from the storage tank.

In the pressure type automatic water system, there are generally space limitations in the home which severely restrict the size of the pump, drive means and storage tank. In most instances, the space limitations have caused suppliers of these systems to furnish a horizontal water tank with the pump and pump drive means mounted separately therefrom. Such an arrangement has a number of deficiencies. A separator float which is utilized in the pressure type system is located in the tank for the purpose of separating, to a large extent, the air from the water. In a system using a horizontal storage tank, the tank is usually cylindrical in shape with the longitudinal axis of the tank parallel to the ground. The width dimension of the tank changes substantially as the water level varies from the top to the bottom of the tank such that a water-gas separator cannot be of uniform size unless the width dimension of the tank is made constant regardless of the water level in the tank. One way this is accomplished is by the addition of straight vertical sides within the tank. Obviously fabricating the tank in this manner serves to increase the cost of such units due to the additional time, material and labor required to make such modifications. In addition, it is known that unless special precautions are taken, the float in the horizontal tank, in some instances, will tilt. Further, an excessive amount of time is required in welding the dip tube assembly to horizontal tanks presently available for domestic use.

The horizontal tank is not suitable in many applications because it takes up a substantial amount of available space. As a result there has been a long felt need in the industry for a water system incorporating a compact vertical storage tank assembly, which is economical in cost and which will permit a savings in available room space due to the use of a vertical storage tank as opposed to conventional horizontal tanks.

Applicants, in arriving at a solution to the deficiencies presently inherent with domestic water systems of the pressure type, has invented a new and unobvious vertical liquid storage tank upon which a pump and drive means can be mounted thereby forming an extremely compact, automatic, space saving water supply system. Applicants' storage tank assembly comprises two deformed, seamless tank shells, one aligned on top of the other and joined together at their flanges to form a tank. A dip tube assembly is inserted in an opening in the top of the tank, the dip tube extending downward for substantially the length of the tank. Preferably, a diffuser is fastened to the end of the dip tube close to the bottom of the tank for diffusing the water as it enters the tank thereby minimizing excessive water turbulence.

A disk float having an opening therein through which the dip tube is passed, is positioned within the tank for separating the air and water layers. In addition, a plate having a number of openings is fastened to the dip tube immediately above the diffuser. A ring of magnesium or other material which can serve as an anode is positioned about the periphery of the plate for the purpose of eliminating corrosion of the tank.

Other features and advantages are inherent in the structure claimed and disclosed, as will be apparent to those skilled in the art from the following detailed description in conjunction with the accompanying drawings:

FIGURE 1 shows a view of a storage tank assembly including a base for mounting the water storage tank, a pump and pump drive means mounting base and water inlet and outlet means attached to said tank;

FIGURE 2 shows a sectional view of the storage tank assembly with a movable float disk situated between the water and air layers in said tank;

FIGURE 3 is an enlarged view of a water diffuser means attached to the end of a dip tube;

FIGURE 4 shows a sectional view of the diffuser along line 4—4 in FIGURE 3;

FIGURE 5 shows a sectional view of the tank assembly along line 5—5 in FIGURE 2;

FIGURE 6 shows a fragmentary section of an anode ring positioned within a recess formed around the periphery of the anode plate;

FIGURE 7 shows a sectional view of the tank assembly along line 7—7 in FIGURE 2; and FIGURES 8–13 show different embodiments of the float disk used in applicants' tank assembly.

A tank assembly for use in a pressure type automatic water system is designated generally as 10 in FIGURE 1. The tank assembly includes tank 11 which is made up of seamless deformed shell sections 12 and 13. Each shell section comprises a cylindrical wall portion 14, 15, one end of the respective portions being flanged at about right angles to and outwardly away from the respective shell sections. Heads 18, 19, each in the shape of an outer zone of a sphere, close off the remaining ends of the wall portions.

Upon assembly of tank 11, shell section 12 is placed upon section 13 in such a manner that the longitudinal axis of the respective shell sections are aligned whereupon the shell sections are welded together in a leak resistant manner about the edges of flanges 16, 17. Providing a weld at this location in the tank assembly is quite advantageous as it permits the closing seam to be resistance welded without causing damage to the interior of the tank proper, which is generally made of galvanized steel, because of the distance between the interior of the tank and the inside edge of the heat-affected zone.

A waist band 60, which comprises a plastic cover, can be installed, if desired, around the welded seam of tank 11 to serve as a shock cushioning bumper.

In at least one of the shells, an indent 20 is formed to provide flat surface 21. Of course, to facilitate production in the process of manufacturing the tank assembly, both shell sections 12 and 13 could be drawn in the same manner so that each section would have an indent 20 therein as seen in FIGURE 2 of the drawings. Opening 22 is made on flat surface 21 of shell section 12 for the reception of dip tube assembly 23. Welded to the top of flat surface 21 is spud 24 which has a threaded opening.

Dip tube 25 which is flared outwardly at end 26 is retained in spud 24 with tube 25 extending downwardly for substantially the length of tank 11.

A portion of water inlet means 27 is threaded in spud 24, the inlet means leading to a pump outlet, not shown.

At the remaining end of dip tube 25, diffuser 29 is fastened by pin 30 or other suitable means, the diffuser serving to spread out the water entering the tank so that turbulence is reduced. Diffuser 29 has a plurality of vanes for directing the flow path of the water as it enters the tank and is made of plastic or other sutiable non-corrosive material.

Contiguous to diffuser 29 is plate 31 having a number of large openings 32 throughout. Plate 31 is fastened to dip tube 25 by pin 33 whereby plate 31 is parallel to diffuser 29. Recess 7 is formed about the periphery in which anode ring 35 is inserted, ring 35 being made of magnesium or other sutiable material. Placing ring 35 in this position in an area of high corrosion susceptibility minimizes corrosion of tank 11.

Float disk 37 is shown in FIGURE 2 situated on top of the water W in tank 11, the float serving to separate the air layer A from the water. Disk 37 rises up and down in the tank, depending for its position upon the level of the water in the tank at any one time. As seen clearly in FIGURE 2, disk 37 is designed to be slightly less in outer diameter than the inside diameter of the aligned cylindrical wall portions 14, 15. Disk 37 has opening 38 through which the dip tube 25 passes, weherby the float rides up and down relative to dip tube 25. It will be observed from FIGURE 2 that the diameter of opening 38 is larger than the outer diameter of tube 25. The disk is so designed in all instances that the edge of openings 38 in the disk cannot, under normal conditions, come in contact with the dip tube 25 because the outside edge of disk 37 will contact the inside surface of the cylindrical wall portion of tank 11 before the edge of hole 38 contacts lip tube 25. Moreover, the disk cannot flip over as occurs in some instances in conventional tanks due to the fact that it is prevented from coming off of dip tube 25.

FIGURES 8 to 13 inclusive illustrate different disk embodiments which can be used with applicant's tank assembly. The disk which is constructed of a material substantially impervious to air and water has a configuration similar to the interior cross-sectional shape of tank 11 and constitutes an air-separating medium within the tank throughout variable water levels whereby absorption of air by the water in the tank is minimized and turbulence of the water at the surface is substantially eliminated. As seen in FIGURES 7, 8 and 11, the outer diameter of the disk is slightly less than the inside diameter of the cylindrical wall portions 14, 15 of tube 10 whereas in FIGURES 9, 10, 12 and 13, the disk is flanged thereby causing somewhat of a wiping action between the cylindrical wall portions and the disk. The design of the disk which can be incorporated in applicants' tank assembly is the subject matter described and claimed in U.S. patents issued to Stephen M. Taylor, No. 3,030,891 and No. 3,191,536.

Positioned on top of head 18 is a pump and pump drive means mounting base 45. Base 45 is recessed at 46 with an opening 47 through which a fastener 48 is inserted and bolted to threaded lug 49 which is welded to head 18. Mounting base 45 is preferably made of steel, although other suitable material can be employed. A plastic mounting base leg cover 61 can be inserted on the legs of base 45. Conventional pump and drive units can readily be assembled upon mounting base 45. The entire tank assembly is mounted upon tank base 50 having a centrally located recess 51 with opening 52 located in the recess. Threaded lug 53 which is welded to head 19 is adapted to receive fastener 54 which is inserted through opening 53 whereby the base and tank are fastened together. Recesses 46 and 51 are of a depth at least equal to the height of the head of the threaded fasteners which are employed for retaining bases 45 and 50 to tank assembly 10. If desired, a plastic insulator 55 is fitted between base 50 and head 19.

An opening 55 is made in the wall portion 15 near the head 19. Spud 56 which has a threaded opening is welded in a leak resistant manner to tank 11. Sutiable liquid outlet means 58, a portion of which is shown in FIGURE 2, is threaded into the opening of spud 55.

The tank employed in applicants' tank assembly varies in size depending upon the capacity of the domestic water system required in a particular installation. In tanks suitable for 10 gallon water capacity, the over-all height of tank 11 is about 16 inches with the inside diameter of the tank measuring about 15 inches. A 25 gallon capacity tank stands about 24.9 inches high with the inside diameter of the tank being about 18 inches.

The foregoing detailed description has been given for clearness of understanding only, and no unnecessary limitations should be understood therefrom, as modifications will be obvious to those skilled in the art.

What is claimed is:

1. A tank assembly for the storage of liquid in an automatic liquid supply system including a liquid storage tank assembly, a pump and pump drive means, said tank assembly comprising:

a tank comprising two shell sections, each of said shell sections comprising a substantially cylindrical wall portion having two ends with one of said ends being flanged outwardly;

a head fixed to the remaining end of said respective wall portions;

said shell sections being joined together by a leak resistant fastening means at the edges of said flanges of said shell sections whereby the longitudinal axis of said cylindrical wall portions are in substantial alignment;

at least one of said shell heads having an opening therein;

a dip tube assembly positioned within said opening and having one of its two ends fixed in a leak resistant manner to said tank, said dip tube assembly including a liquid inlet means, a dip tube extending within said tank for substantially the length of said assembled tank, said tube being substantially parallel to the longitudinal axis of said wall portions;

a liquid outlet means located near the bottom of said tank; and, a disk means located within said tank having an opening therein through which said dip tube is inserted, whereby said disk is capable of moving up and down in said tank along the length of said dip tube, its position in said tank at any one time depending upon the liquid level in said tank.

2. A tank assembly in accordance with claim 1 wherein said dip tube assembly further includes a diffuser fastened to said remaining end of said dip tube assembly.

3. A tank assembly in accordance with claim 1 further including an anodic protective means disposed within said tank for minimizing corrosion of said tank.

4. A tank assembly in accordance with claim 2 further including a perforated plate attached to said dip tube assembly contiguous to said diffuser near the bottom of said tank, said plate having said anodic protective means attached thereto.

5. A tank assembly in accordance with claim 1 further including a pump and pump drive means mounting base fastened to the top of said tank assembly.

6. A tank assembly in accordance with claim 5 further including a tank assembly base, said base supporting said tank assembly.

7. A tank assembly in accordance with claim 1 further including a flexible waist band positioned on said fastened flanges to serve as a shock bumper.

8. A tank assembly for the storage of liquid in an automatic liquid supply system including a liquid storage tank assembly, a pump and pump drive means, said tank assembly comprising:
- a vertical tank comprising two shell sections, each of said shell sections comprising a substantially cylindrical wall portion having two ends with one of said ends being flanged outwardly;
- a head fixed to the remaining end of said respective wall portions;
- said shell sections being joined together by a leak resistant fastening means at the edges of said flanges whereby the longitudinal axis of said cylindrical wall portions are in substantial alignment;
- at least one of said shell heads having an opening therein;
- a threaded inlet spud welded to the outside of said tank at the location of said opening;
- a dip tube assembly disposed within said inlet spud, said dip tube assembly comprising:
- a dip tube having one of its two ends disposed within said inlet spud, said dip tube extending downward for substantially the length of said tank;
- a diffuser means attached to the remaining end of said dip tube for diverging the flow path of liquid entering said tank;
- a disk means located within said tank having an opening therein through which said dip tube is inserted;
- a plate having a plurality of openings therein said plate being fastened to said dip tube contiguous to said diffuser; and,
- a liquid outlet means located near the bottom of said tank.

9. A tank assembly in accordance with claim 8 further including a flexible waist band positioned on said fastened flanges to serve as a shock bumper.

10. A tank assembly in accordance with claim 9 further including a pump and drive means mounting base attached to the top of said tank assembly.

11. A tank assembly in accordance with claim 10 further including a tank assembly base, said base supporting said tank assembly.

12. A tank assembly in accordance with claim 1 wherein said shell sections are drawn.

13. A tank assembly for the storage of liquid in an automatic liquid supply system including a liquid storage tank assembly, a pump and pump drive means, said tank assembly comprising:
- a tank comprising two drawn shell sections, each of said shell sections comprising a substantially cylindrical wall portion having two ends;
- a head fixed to one of said ends of each of said respective wall portions;
- said shell sections being joined together at said remaining ends by a leak-resistant fastening means whereby the longitudinal axis of said cylindrical wall portions are in substantial alignment;
- at least one of said shell heads having an opening therein;
- a dip tube assembly positioned within said opening and having one of its two ends fixed in a leak-resistant manner to said tank, said dip tube assembly including a liquid inlet means, a dip tube extending within said tank for substantially the length of said assembled tank, said tube being substantially parallel to the longitudinal axis of said wall portions;
- a liquid outlet means located near the bottom of said tank; and,
- a disk means located within said tank having an opening therein through which said dip tube is inserted, whereby said disk is capable of moving up and down in said tank along the length of said dip tube, its position in said tank at any one time depending upon the liquid level in the tank.

References Cited
UNITED STATES PATENTS

| | | | |
|---|---|---|---|
| 3,030,891 | 4/1962 | Taylor | 103—224 X |
| 3,131,721 | 5/1964 | Allen | 137—568 |

ROBERT B. REEVES, *Primary Examiner.*

HADD S. LANE, *Examiner.*